United States Patent [19]

North

[11] Patent Number: 4,794,997
[45] Date of Patent: Jan. 3, 1989

[54] ROAD VEHICLE POWER ASSISTED STEERING SYSTEM

[75] Inventor: Bernard G. North, Yatton, Great Britain

[73] Assignee: TRW Cam Gears Limited, Clevedon, Great Britain

[21] Appl. No.: 12,256

[22] Filed: Feb. 9, 1987

[30] Foreign Application Priority Data

Feb. 7, 1986 [GB] United Kingdom ............... 8603084

[51] Int. Cl.[4] ............................................. B62D 5/04
[52] U.S. Cl. ............................... 180/79.1; 74/388 PS; 318/376
[58] Field of Search ............... 180/79.1, 142; 318/380, 318/376; 74/388 PS

[56] References Cited

U.S. PATENT DOCUMENTS 4,201,935  5/1980  Fukuma et al. .................... 318/380
4,415,054 11/1983  Drutchas ............................ 180/79.1
4,580,648  4/1986  Murakami et al. ................. 180/79.1

FOREIGN PATENT DOCUMENTS 3414346  4/1985  Fed. Rep. of Germany.

Primary Examiner—John A. Pekar

[57] ABSTRACT

A road vehicle power assisted steering system comprises a power assisted steering gear assembly (1) in which power assistance to the displacement of an output member of the steering gear (1) is provided by an electric motor in response to a steering gear torque applied to the input member (2). Motorcon also of the electric motor are capable of being switched from a power supply (10), to a resistive load and are controlled by control means (11) in response to the steering torque so that any kinetic energy of the displaceable components of the steering gear (1) may be dissipated by the resistive load to which the coils are switched by the control means when the steering torque falls below a predetermined value.

8 Claims, 2 Drawing Sheets

ROAD VEHICLE POWER ASSISTED STEERING SYSTEM

TECHNICAL FIELD AND BACKGROUND ART

The present invention relates to a road vehicle power assisted steering system and is particularly concerned with a system in which power assistance to displacement of a steering component of a steering gear assembly is provided by actuation of electric motor means. Such a steering system is generally known from U.S. Pat. No. 4,415,054. This latter U.S. Patent discloses a rack and pinion steering gear assembly in which permanent magnets of an electric motor are incorporated in a rack bar housing; rotor coils or windings of the motor are rotatably mounted in the rack bar housing to rotate with a ball nut that is longitudinally restrained relative to the rack bar and engages with a screw threaded portion of the rack bar so that, when an electric current is applied to the motor, the ball nut is caused to rotate and drive the rack bar longitudinally with a force which is related to the magnitude of the applied current and in a direction dependent upon the polarity of the applied current to provide the required power assistance to displacement of the rack bar. The magnitude and polarity of the current which is applied to the motor is controlled in response to the magnitude and direction of a steering torque which is applied to the rack and pinion gear through the pinion. With such a known system, it is readily appreciated that during a steering manoeuvre a substantial amount of kinetic energy will be developed by the movement of the rack bar, the rotor/ball nut and other displaceable parts of the steering gear assembly. This kinetic energy, if not rapidly dissipated from the steering system at the end of an applied torque sequence for a particular steering manoeuvre, can cause the displaceable steering component of the gear assembly to over-shoot or over-steer with consequential adverse effects on the steering characteristics of the system. A possible means of alleviating this problem is to dampen the steering system, for example by increasing the resistance or friction to displacement of the components in the gear assembly, this however is considered unacceptable since the high levels of friction necessary to provide adequate damping would make the steering system harder to operate, would increase wear, and would require a more powerful electric motor which would result in greater expense and size of the system and be a greater drain on the power output of the road vehicle. It is an object of the present invention to provide an electric power assisted steering system for a road vehicle which provides an efficient, simple and economical means of alleviating the problems associated with over-steering or over-shooting of the displaceable components of the steering gear assembly as discussed above.

STATEMENT OF INVENTION AND ADVANTAGES

According to the present invention there is provided a road vehicle power assisted steering system of the electric type in which an electric motor device provides power assistance to a steering output member of a steering assembly in the system, the actuation of said electric motor device being controlled by control means that responds to steering input torque and road speed to determine a power assistance level, a load resistance being connected across the motor terminals to provide a braking effect when the power assistance level falls below a predetermined value, the resistance being present for all conditions of input torque and road speed when the power assistance level is below said predetermined value; the electric motor acting as a generator and the resistance absorbing the kinetic energy in the electric motor when the power assistance falls to zero.

At the commencement of a steering manoeuvre the steering torque which is applied to an input member of the steering gear assembly (such as a pinion of a rack and pinion steering gear) is zero and rises progressively and as appropriate in accordance with the curve through which the vehicle is to be manoeuvred. The magnitude and direction of the steering torque may be sensed by a torque sensitive device which is conveniently mounted on the input member of the steering gear such as the aforementioned pinion or on a steering column. When the components of the steering gear assembly have been displaced sufficiently to effect the manoeuvre no additional input torque is applied to the assembly; at this time the kinetic energy of the electric motor device will tend to encourage the displaceable components, particularly the steering output member of the gear assembly, to effectively over-shoot to a certain extent. However, when the steering is centralised the kinetic energy becomes even more of a problem and can cause excessive over-shoot and even tend to go in advance of the input torque. By the present invention this overshoot condition can be controlled by the electric load circuit part means placed across the terminals of the assistance motor. Conveniently this electric load circuit part may be a solid state solenoid switch device or a fixed resistor. The load circuit part preferably comprises a resistive load so that the electric motor means consequently acts as a generator and the kinetic energy of the displaceable components associated therewith is converted to electrical energy which is dissipated in the load circuit part. In this way the kinetic energy of the steering gear assembly may rapidly be dissipated to alleviate the problem of over-shooting or over-steering. When the steering input torque ceases to reduce the control means may automatically be re-set for the electric motor means to be connected to the power supply of the vehicle in readiness to provide power assistance in response to the application of a further steering input torque.

Preferably the steering gear assembly and electric motor means is of the form discussed in U.S. Pat. No. 4,415,054 although it will be appreciated that the present invention may be applied, with advantage, to road vehicle steering gear assemblies other than of the rack and pinion type provided that displacement of a steering output component of the assembly is assisted by electric motor means.

A preferred feature of the present invention is that the power assistance provided by the system is responsive to the speed of the road vehicle whereby as the speed of the vehicle increases the power assistance provided by the electric motor for a steering manoeuvre reduces and vice versa. This may be achieved by incorporating in the control means of the system a vehicle speed sensor which provides signals in accordance with vehicle speed to a computer device which latter device also receives signals in accordance with the steering input torque and the direction of such torque which is applied to the gear assembly. The computer device is arranged to determine the magnitude of the current or electrical supply signals and the polarity of such signals which are fed to actuate the electric motor and thereby determines the power assistance which will be provided for a particular steering manoeuvre. In practice, the computer device will be preprogrammed so that the most favourable power assistance characteristics will be provided from an assessment of the vehicle speed and the steering input torque.

DRAWINGS

One embodiment of an electric power assisted steering system for a road vehicle and constructed in accordance with the present invention will now be described, by way of example only, with reference to the accompanying illustrative drawings in which.

DETAILED DESCRIPTION OF DRAWINGS

Figure 1:
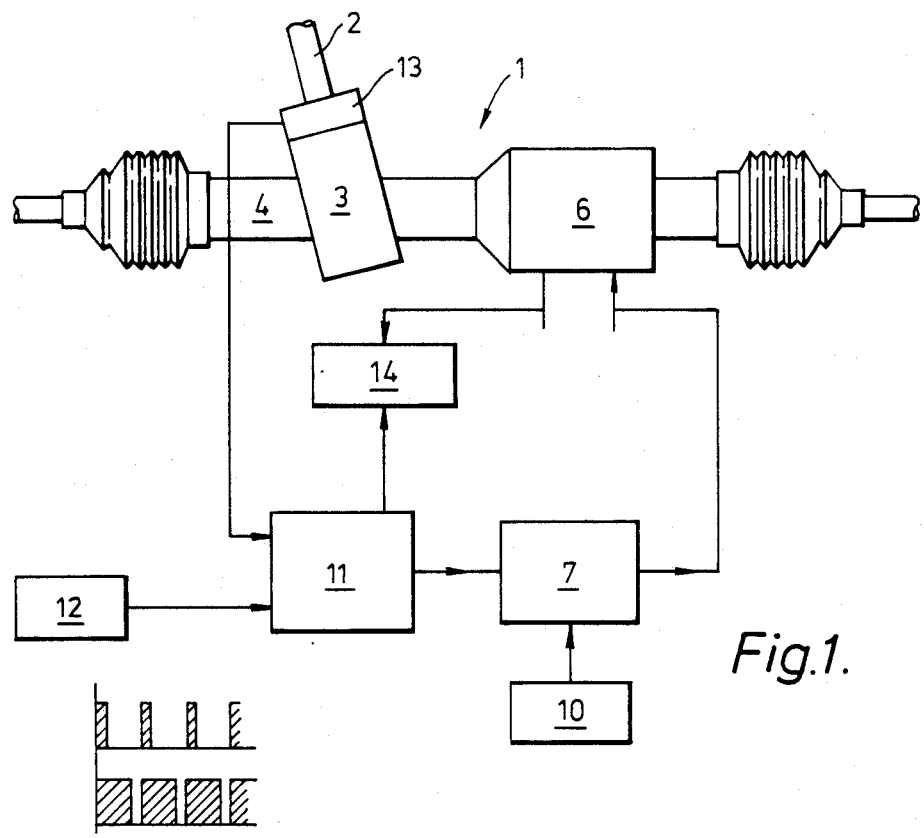
FIG. 1 is a diagrammatic representation of the system.

The system diagrammatically illustrated in FIG. 1 incorporates a rack and pinion steering gear assembly 1 which may, conveniently, be regarded as substantially the same as the corresponding assembly in U.S. Pat. No. 4,415,054. Accordingly the assembly 1 has a pinion 2 the shaft of which projects from a pinion housing 3 and a rack bar housing 4 within which a rack bar is longitudinally displaceable in response to rotation of the pinion 2. An electric motor housing 6 is formed as part of the rack bar housing 4 and encloses an electric motor (not shown). The electric motor has its stator permanent magnets fixedly mounted in the housing 6 while its rotor windings or coils are carried by, and for rotation with, a ball nut which screw threadedly engages with a threaded portion of the rack bar. The ball nut is restrained from longitudinal displacement relative to the housings 4 and 6 so that on rotation of the rotor/ball nut by energisation of the rotor windings, a force is applied to the rack bar to assist in its longitudinal displacement.

Figure 2:
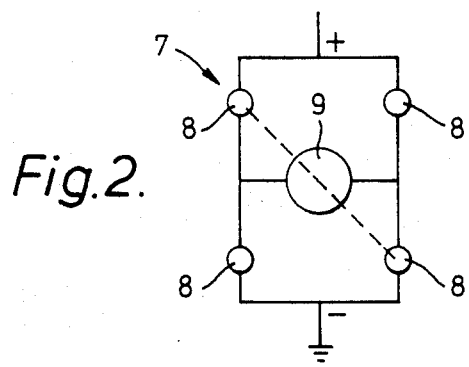
FIG. 2 shows a diagrammatic representation of a power driver unit which is incorporated in the system of FIG. 1.

The magnitude and polarity of the electric current which is supplied to the windings or coils of the electric motor is provided from a power driver unit 7. This unit 7, as shown in FIG. 2, is generally in the form of a solenoid switch and basically comprises four heavy current transistors 8 capable of regulating the power supply to the electric motor (shown generally at 9 in FIG. 2) within the motor housing 6, such power being drawn from the electrical system 10 of the vehicle.

The power driver unit 7 forms part of an electrical control system for the electric motor and is actuated in response to signals transmitted thereto from a computer or micro-processor device 11 in the control system. Consequently the magnitude and polarity of the electric current to the power assistance motor (and thereby the power assistance which is provided) is regulated by the unit 7 under control of the computer device 11.

The computer device 11 which may conveniently be regarded as a logic unit of the electrical control system receives electrical signals derived from a vehicle speed sensor 12 and a steering torque sensor 13. The torque sensor 13 is coupled to the pinion 2 and senses the magnitude and direction of any steering torque which is applied to the pinion during a steering manoeuvre. The computer device 11 is pre-programmed to compute, in response to input signals derived from the units 12 and 13, the optimum or most favoured amount of power assistance which should be provided by the electric motor for a particular steering manoeuvre (as indicated by the manual effort or input torque applied to effect that manoeuvre and the prevailing vehicle speed) and provides an output signal to the power driver unit 7 to regulate and control the power assistance motor accordingly. The computer device 11 also compares the instant value of the power assistance with a predetermined level and assesses whether that assistance is above or below the predetermined level. When that level is achieved the electrical load is removed. The electrical load may comprise an E.M.F. brake logic control system part 14 which, when actuated effectively shorts the rotor coils of the electric motor. The control system part 14 preferably includes a fixed load resistance connectable across the motor by a relay switch, the relay switch being controlled by the computer device 11. The relay of part 14 further functions to connect or disconnect the supply of electrical current to or from the electric motor. When the power assist value is above the predetermined level, the part 14 connects the source of electrical energy to the motor and disconnects the fixed, resistive load. When the power assist value is below the predetermined level, the part 14 disconnects the source of electrical energy from the motor and connects the fixed, resistive load across the motor. When the supply of electrical current to the electric motor is cut off the power assistance electric motor is thereby converted to an electrical generator and kinetic energy which the rotor/nut has acquired during a steering manoeuvre is rapidly dissipated by its conversion into electrical energy through the resistive load of the system part 14. The E.M.F. brake logic system part 14 is actuated only when the power assistance level is below the predetermined level.

Figure 3:
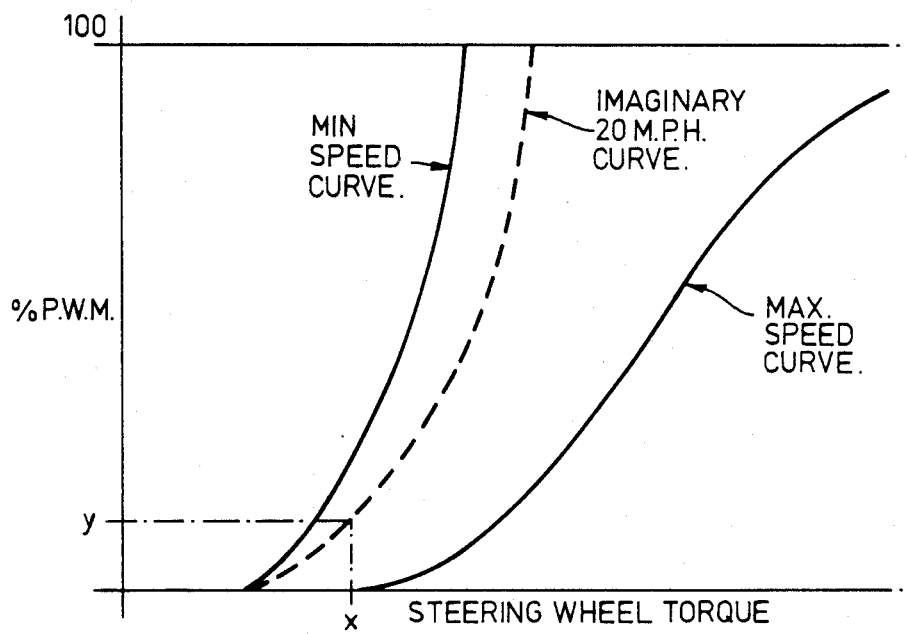
FIG. 3 is a graph illustrating the manner in which power assistance provided by the system may be responsive to vehicle speed.

In a preferred form the computer device 11 or control system logic unit provides, when the steering input torque is constant or increasing, a series of modulated pulses or signals which regulate the power driver unit 7 for the electric motor to provide the appropriate power assistance and these signals have a pulse width modulation which varies as a percentage in accordance with the prevailing vehicle speed and the applied input torque during a steering manoeuvre. Consequently, the power assistance which is provided by the electric motor will increase as the percentage pulse width modulation increases. With this in mind, and referring to FIG. 3, the computer device may be pre-programmed to comprise a series of nomograms representative of the percentage pulse width modulation (% P.W.M.—shown as the ordinate in the graph of FIG. 3) and steering input torque (steering wheel torque—shown as the abscissa in the graph of FIG. 3). The curve lines in the graph of FIG. 3 are representative of the preferred or most favourable manner in which the power assistance required of the electric motor (as indicated by the % P.W.M) will vary for different vehicle speeds and in accordance with steering wheel torque. Three lines are given indicating the minimum speed curve, the maximum speed curve and an imaginary curve with the vehicle speed at, say, 20 m.p.h. With the minimum speed curve which would be consistent with the vehicle being manoeuvred for, say, parking it will be apparent that the % P.W.M., and thereby the power assistance, rapidly increases to 100% or maximum power assistance with relatively small increase in steering wheel torque. However, from the maximum speed curve, say with the vehicle cruising at high speed it will be apparent that for small steering wheel torques the % P.W.M. is maintained at zero so there is no power assistance although even at high speed power assistance will become available with greater steering wheel torques and as may be necessary to effect an emergency steering manoeuvre. It will thus be appreciated that by its pre-programming the computer device 11 will relate a particular speed of the vehicle, say on the imaginary 20 m.p.h. curve to an instant steering wheel torque x to determine the appropriate % P.W.M. signal y and transmit this signal to regulate the power driver unit 7 to provide the appropriate power assistance from the electrical motor.

I claim:

1. A vehicle power steering system comprising:
   a steering gear having a steering output member displaceable to effect steering of steerable wheels in response to rotation of a steering wheel of the vehicle;
   an electric motor for providing power assistance to displacement of said steering output member in response to electric current applied to said electric motor;
   a source of electrical current;
   control means for providing a control signal having a value responsive to applied steering torque and vehicle speed; and
   logic control means for connecting a load having a fixed resistive value across said electric motor when said control signal falls below a predetermined value to dissipate electrical energy and thereby brake the electric motor.

2. The system of claim 1 wherein said logic control means includes relay means for disconnecting the electric motor from the source of electrical current when said control signal falls below said predetermined value and for making said source of electrical current available to said electric motor when said control signal is above said predetermined value.

3. A system as claimed in claim 1 in which the control signal is a pulse width modulated signal.

4. A system as claimed in claim 1 in which the logic control means comprises a solid state switching device.

5. A system as claimed in claim 1 in which the load comprises a solid state solenoid switch device.

6. A system as claimed in claim 1 in which the control means is a preprogrammed electronic device.

7. A system as claimed in claim 1 in which the value of steering torque applied is sensed by a torque sensor 30 mounted on an input member of the assembly.

8. A system as claimed in claim 1 in which the assembly comprises a rack and pinion steering gear, a rack bar comprising the output member and a pinion providing the input member; the electric motor device being coupled to the rack bar to assist in displacement thereof.

* * * * *